United States Patent
Monros

(10) Patent No.: US 9,784,152 B2
(45) Date of Patent: Oct. 10, 2017

(54) MULTI-FUEL SYSTEM FOR INTERNAL COMBUSTION ENGINES

(71) Applicant: Serge V. Monros, Costa Mesa, CA (US)

(72) Inventor: Serge V. Monros, Costa Mesa, CA (US)

(*) Notice: Subject to any disclaimer, the term of this patent is extended or adjusted under 35 U.S.C. 154(b) by 0 days.

(21) Appl. No.: 15/052,203

(22) Filed: Feb. 24, 2016

(65) Prior Publication Data
US 2016/0169143 A1    Jun. 16, 2016

Related U.S. Application Data

(63) Continuation-in-part of application No. 14/308,103, filed on Jun. 18, 2014, now Pat. No. 9,279,372.
(Continued)

(51) Int. Cl.
| | |
|---|---|
| F02M 21/02 | (2006.01) |
| F01M 13/00 | (2006.01) |
| F02M 43/04 | (2006.01) |
| F02M 43/00 | (2006.01) |
| F02B 43/00 | (2006.01) |
| F02M 25/06 | (2016.01) |

(Continued)

(52) U.S. Cl.
CPC ........ *F01M 13/0011* (2013.01); *F01M 13/00* (2013.01); *F01M 13/04* (2013.01); *F02B 43/00* (2013.01); *F02D 19/0647* (2013.01); *F02D 19/0694* (2013.01); *F02D 19/081* (2013.01); *F02D 41/0025* (2013.01); *F02M 25/06* (2013.01); *F02M 43/00* (2013.01); *F02M 43/04* (2013.01); *F02B 3/06* (2013.01); *F02D 41/0027* (2013.01); *F02D 2250/08* (2013.01); *F02M 2200/95* (2013.01); *Y02T 10/32* (2013.01); *Y02T 10/36* (2013.01)

(58) Field of Classification Search
CPC ............. F02M 43/00; F02M 35/10222; F02M 2200/95; F02M 21/0215; F02M 21/042; F02M 25/00; F02D 41/0027; F02D 2250/08; F02D 41/0025; F02D 19/0647; F02D 19/081; F02D 19/0694
See application file for complete search history.

(56) References Cited

U.S. PATENT DOCUMENTS 2,911,958 A    11/1959 Griep
3,175,546 A *  3/1965 Roper .................. F01M 13/025
                                                  123/572
(Continued)

FOREIGN PATENT DOCUMENTS

DE    29501002 U1    3/1995

OTHER PUBLICATIONS

International Search Report and Written Opinion for International application No. PCT/US14/43168, dated Oct. 23, 2014.

*Primary Examiner* — Long T Tran
(74) *Attorney, Agent, or Firm* — Kelly & Kelley, LLP

(57) ABSTRACT

In a multi-fuel system for diesel engines, natural gas is mixed with diesel fuel and conditioned in a mixing chamber before being injected into the mixing chamber of the engine. Filtered blow-by gas may also be introduced into the combustion chamber. A computerized controller is used to determine and control the proportion of diesel fuel, natural gas fuel, the mixing and conditioning of these fuels, and the supply of filtered blow-by gas.

29 Claims, 7 Drawing Sheets

Related U.S. Application Data

(60) Provisional application No. 61/840,129, filed on Jun. 27, 2013.

(51) Int. Cl.
  F02D 19/06 (2006.01)
  F02D 19/08 (2006.01)
  F01M 13/04 (2006.01)
  F02D 41/00 (2006.01)
  F02B 3/06 (2006.01)

(56) References Cited

U.S. PATENT DOCUMENTS

| | | |
|---|---|---|
| 4,235,374 A | 11/1980 | Walter et al. |
| 5,035,206 A | 7/1991 | Welch et al. |
| 5,373,702 A | 12/1994 | Kalet et al. |
| 5,522,428 A | 6/1996 | Duvall |
| 5,829,418 A | 11/1998 | Tamura et al. |
| 5,992,394 A * | 11/1999 | Mukaidani ............ B01D 35/027 123/509 |
| 5,992,397 A * | 11/1999 | Hideaki ................. F02M 25/06 123/25 A |
| 6,427,660 B1 | 8/2002 | Yang |
| 6,508,209 B1 | 1/2003 | Collier, Jr. |
| 6,729,316 B1 * | 5/2004 | Knowles ............. F01M 13/022 123/572 |
| 6,923,168 B2 | 8/2005 | Bryde |
| 7,918,214 B2 * | 4/2011 | Kerns ................. F02D 41/0042 123/520 |
| 8,220,439 B2 | 7/2012 | Fisher |
| 8,353,276 B2 * | 1/2013 | Lewis .................... F02M 25/06 123/572 |
| 8,360,038 B2 | 1/2013 | Monros |
| 8,726,892 B2 * | 5/2014 | Lewis .................... F02M 25/06 123/520 |
| 2007/0169759 A1 | 7/2007 | Frenette et al. |
| 2007/0175459 A1 | 8/2007 | Williams et al. |
| 2007/0193553 A1 | 8/2007 | Chipperfield |
| 2008/0041034 A1 * | 2/2008 | Hosoi .................... F01N 3/208 60/276 |
| 2009/0320789 A1 | 12/2009 | Lund |
| 2011/0017174 A1 | 1/2011 | Ulrey et al. |
| 2011/0232601 A1 | 9/2011 | Kim |
| 2012/0004824 A1 | 1/2012 | Milton et al. |
| 2012/0060800 A1 * | 3/2012 | Green ....................... F02D 9/02 123/510 |
| 2012/0145126 A1 | 6/2012 | Krug et al. |
| 2013/0055987 A1 | 3/2013 | Wirz |
| 2013/0125866 A1 * | 5/2013 | Lewis .................... F02M 25/06 123/574 |
| 2013/0160741 A1 | 6/2013 | Sommars et al. |
| 2014/0041633 A1 | 2/2014 | Kim et al. |
| 2014/0182553 A1 * | 7/2014 | Lee ....................... F02M 55/025 123/456 |
| 2015/0000638 A1 | 1/2015 | Monros |
| 2015/0337696 A1 * | 11/2015 | Glugla ................. F02D 41/003 123/574 |

* cited by examiner

MULTI-FUEL SYSTEM FOR INTERNAL COMBUSTION ENGINES

RELATED APPLICATION

This is a continuation-in-part of U.S. application Ser. No. 14/308,103, filed Jun. 18, 2014 (U.S. Pat. No. 9,279,372), which claimed the benefit of U.S. Provisional Application No. 61/840,129, filed on Jun. 27, 2013.

BACKGROUND OF THE INVENTION

The present invention generally relates to fuel systems for an internal combustion engine. More particularly, the present invention relates to a multi-fuel system for an internal combustion engine that utilizes both diesel and natural gas.

It is estimated that there are currently three hundred million vehicles on America's roads. Every day, the average American spends almost an hour driving in a car. Additionally, approximately seventy percent of goods that are shipped in America travel on commercial vehicles. Clearly, automobiles are an integral part of everyday life in America. The same is true for most countries around the world. The world's dependence on automobiles creates a similar dependence on fuel sources to power these automobiles. Most vehicles on the road today are fueled by gasoline or diesel fuel. Most commercial vehicles are fueled by diesel fuel.

The reliance on fossil fuels creates a host of problems. Diesel fuel prices fluctuate on a daily basis, but there is a definite upward trend in fuel pricing. There are no indicators to suggest that these fuel prices will go down in the foreseeable future. The air pollution problems inherent in the operation of gasoline fueled and diesel oil fueled internal combustion engines are well known. These air pollutants include carbon monoxide, nitrogen dioxide, particulate matter, ozone, sulfur dioxide and lead. All these pollutants are known sources of a wide variety of health problems in humans, as well as ozone depletion and acid rain in the environment. Many speculate that air pollution is causing the gradual and irreversible warming of the globe.

For these reasons, various emission control devices are presently in use, and may be required by federal regulations in order to reduce the amount of pollutants discharged in the atmosphere by internal combustion engines. These emission control devices are in response to various Air Quality Standards set by the Environmental Protection Agency (EPA), including the Clean Air Act. Individual states also have their own environmental protection regulations and methods of enforcement. California's Air Resources Board (CARB) is the strictest regulatory body concerned with pollution in the country. The emissions standards set by CARB are stricter than the federal EPA requirements, specifically with regard to hydrocarbon and nitrogen oxide emissions, which become smog. Currently, sixteen other states have adopted, or are in the process of adopting, California's strict emissions standards.

Emission control devices, however, only remove a portion of the pollutants and are subject to deterioration with the passage of time. Also, they often hinder engines from operating at peak efficiencies. Such emission control devices also are somewhat limited in their ability to remove pollutants, and increase the costs of the automobiles significantly.

Discharge or burning of blow-by gas also contributes to emissions. In a diesel powered engine, oil is used to lubricate the crankshaft and connecting rod bearings. The crankcase is mainly filled with air and oil. It is the intake manifold that receives and mixes fuel and air from separate sources. The fuel/air mixture in the intake manifold is drawn into the combustion chamber where it is ignited by a sparkplug, or as a result of compression in the combustion chamber due to the movement of the piston shaft. Although piston rings, disposed around the outer diameter of the pistons within the piston cylinder, are intended to seal off from the crankcase the unburned and burned fuel and air injected into the combustion chamber, the piston rings are unable to completely seal off the piston cylinder. Thus, waste gas enters the crankcase, which is commonly called "blow-by" gas.

Blow-by gasses mainly consist of contaminants such as hydrocarbons (unburned fuel), carbon dioxide and/or water vapor, all of which are harmful to the engine crankcase. The trapping of blow-by gasses in the crankcase allows the contaminants to condense and accumulate over time in the engine crankcase. Condensed contaminants form corrosive acids and sludge in the interior of the crankcase. This decreases the ability of the engine oil in the crankcase to lubricate the cylinder and crankshaft. The degraded oil that fails to properly lubricate the crankshaft components can be a factor in increased wear and tear in the engine, as well as poor engine performance.

Crankcase ventilation systems have been developed to expel blow-by gasses out of a positive crankcase ventilation (PCV) valve and into the intake manifold to be re-burned. However, such blow-by gasses removed from the crankcase often contain relatively high levels of lubricating oil and the like, which are introduced into the air intake manifold and thus into the combustion chamber, which increases the pollution generated by the vehicle.

These issues are especially problematic in diesel engines as diesel engines burn diesel fuel which is much more oily and heavy than gasoline. Thus, the blow-by gas produced by the crankcase of the diesel engine is much more oily and heavy than gasoline blow-by gas. Of course, the burning of such diesel blow-by gas creates even a greater pollution concern.

Recently, there have been found vast sources of natural gas within the United States. Natural gas is also sometimes used as a fuel for internal combustion engines. It has the capability of producing less combustion pollutants and decreasing engine operating costs without complex emission control devices. Its use is anticipated to reduce the rate of world fossil fuel consumption.

Since the current transportation infrastructure does not include large numbers of widely dispersed retail suppliers of natural gas for vehicles, it has been impractical to produce vehicles that are fueled solely by gaseous fuels like natural gas due to range limitations. Instead, it is more practical to equip vehicles with a supply of both a liquid fuel, such as diesel fuel, and an auxiliary supply of gaseous fuel such as natural gas.

Accordingly, there is a continuing need for a system which is capable of burning not only diesel fuel, but diesel fuel combined with natural gas so as to lessen the emissions of the diesel combustion engine. What is further needed is such a system that does so with as little retrofitting as possible to the existing fuel intake systems and configuration, in order to lessen the complexity and the cost of the system and also to enable existing diesel engines to be retrofitted. What is also needed is such a system that filters the blow-by gas of the diesel engine crankcase, so as to maintain a clean and filtered lubricating oil within the crankcase, while lessening the environmental impact of blow-by gasses that are introduced into the combustion chamber. The present invention fulfills these needs, and provides other related advantages.

SUMMARY OF THE INVENTION

The present invention is directed to a multi-fuel engine system. The multi-fuel engine system starts with a diesel engine having a diesel tank fluidly connected to a combustion chamber by a first supply line. The diesel engine may include a fuel injector rail and a fuel injector that extends into the combustion chamber, in which case the first supply line is fluidly connected to the combustion chamber through the fuel injector rail and fuel injector. The fuel injector is responsive to a microcontroller as described below.

The engine preferably has a plurality of combustion chambers corresponding to any number of a plurality of pistons in the engine. With a plurality of pistons and combustion chambers, the engine may also include a plurality of fuel injectors extending from the fuel injector rail into each combustion chamber.

The system also has a natural gas tank fluidly connected to the combustion chamber by a second supply line, which may also pass through the fuel injector rail and fuel injector if present. The natural gas tank is preferably made from a puncture resistant material or carbon fiber. The natural gas tank and the second supply line are preferably pressurized.

The system also has a mixing chamber disposed in-line with the first and second supply lines, wherein the mixing chamber mixes diesel fuel from the diesel tank and natural gas from the natural gas tank to form a multi-fuel mixture before the combustion chamber. A microcontroller is coupled to a sensor monitoring an operational characteristic of the diesel engine, particularly engine temperature, battery charge, engine RPMs, rate of acceleration, exhaust features, or PCV valve position.

The mixing chamber is responsive to the microcontroller for selectively modulating formation of the multi-fuel mixture. The mixing chamber preferably processes the multi-fuel mixture by expanding, aerating, pressurizing, heating, or cooling, which is done in response to a signal from the microcontroller. The mixing chamber preferably mixes the diesel fuel and the natural gas in a range from pure diesel to a 1:1 ratio, also in response to a signal from the microcontroller.

The diesel tank preferably includes a diesel level sensor that is wirelessly connected to the microcontroller. The natural gas tank also preferably has a natural gas level sensor wirelessly connected to the microcontroller. The microcontroller is configured to selectively modulate formation of the multi-fuel mixture responsive to signals from the diesel level sensor and the natural gas level sensor. The microcontroller is preferably configured to increase diesel fuel in the mixing chamber in response to increased torque, increased load, or increased altitude of the engine. The increased torque, increased load, or increased altitude of the engine is determined by analysis of the operational characteristic of the diesel engine by the sensor.

The system preferably comprises a blow-by gas system comprising a PCV valve disposed in-line with a recirculating line extending from a crankcase of the diesel engine to the mixing chamber. The blow-by gas system further includes an oil filter in the recirculating line between the crankcase and the PCV valve.

The system may also include a display device wirelessly connected to the microcontroller, the diesel level sensor, and the natural gas level sensor. The display device is may be configured to display a level of diesel fuel in the diesel tank, a level of natural gas in the natural gas tank, and a ratio of diesel fuel to natural gas in the multi-fuel mixture in the mixing chamber. The display device may be a smart phone or a dashboard mounted monitor. The display device may be configured to receive user input and transmit control signals to the microcontroller. The control signals may manually modulate formation of the multi-fuel mixture. The user input may be received by touch screen, button, or voice recognition.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE INVENTION

As shown in the accompanying drawings, for purposes of illustration, the present invention resides in a dual diesel and natural gas system for a diesel combustion engine. In accordance with an embodiment of the present invention, a diesel engine system is converted into a multiple fuel engine which operates on a combination of diesel fuel and natural gas fuel. In a preferred embodiment, the multiple fuel system operates on diesel as a first fuel and natural gas as a second fuel, being combined with diesel to lessen emissions. The system of the present invention can also potentially cause a dramatic increase in engine efficiency, such that the user can keep his car fueled for much less than it would cost to fuel a standard diesel engine.

In accordance with the invention, existing diesel engines can be retrofitted with as little modification to the standard diesel engine as possible. For example, the only additions required to the standard diesel engine would be a tank for the natural gas and fuel line, a mixing chamber for the mixing of the fuels, a microcontroller, and in one embodiment a PCV valve and a blow-by gas filter. Although calibrated fuel injectors may be used, these are not necessary, and no additional alterations are needed for the actual engine.

Figure 1:
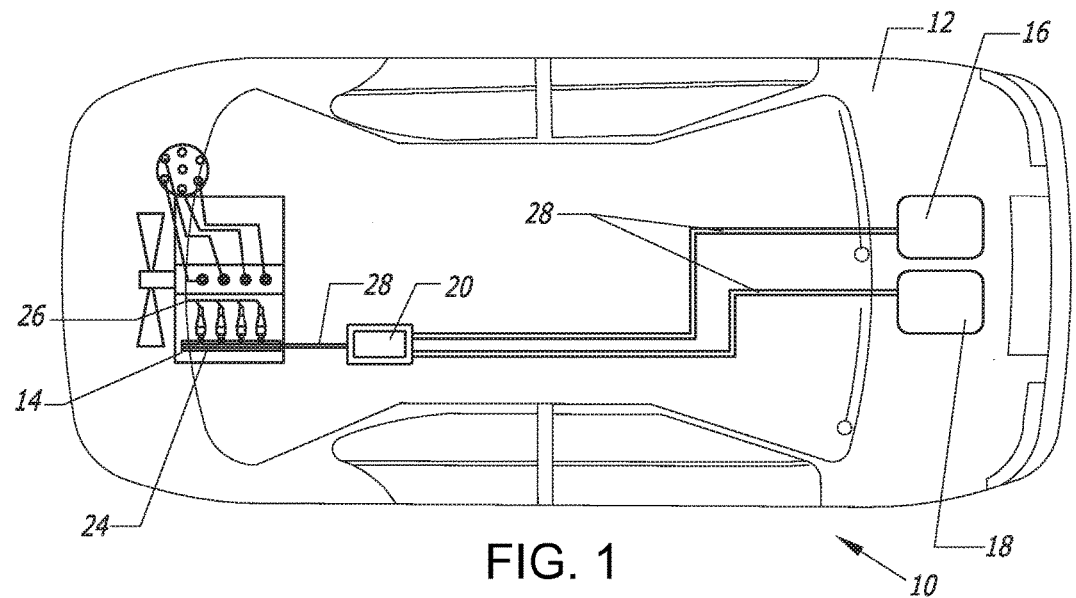
FIG. 1 is a schematic illustration of vehicle with a multi-fuel system of the present invention.

With reference now to FIG. 1, the dual fuel system is generally referred to herein by the reference number 10. A vehicle 12 is shown with an engine 14, a fuel injector rail 24 and four fuel injectors 26. By and large, fuel injection systems have replaced the old carburetor systems. Carburetors supplied fuel to the engine based on suction, while fuel injection systems supply fuel via a direct injection spray. The amount of fuel sprayed into the engine's combustion chamber may correspond to the amount of air entering the engine, resulting in the fuel injection system making the engine much more efficient.

Normally, a fuel injection system only functions with one type of fuel. The dual fuel system of the present invention functions with both standard diesel as well as natural gas fuels. The dual fuel system 10 can be retrofitted into an existing vehicle, or it can be factory installed into a new vehicle. The vehicle 12 illustrated in FIG. 1 is for exemplary and illustration purposes only. It will be appreciated that the system 10 of the present invention can be used in a variety of vehicles and in fact in conjunction with diesel engines which are not part of a vehicle.

The system 10 of the present invention requires both the standard diesel tank 16 as well as a separate natural gas tank 18. The natural gas tank 18 may be made of carbon fiber or some other material that is puncture resistant and capable of transporting materials under pressure. Typically, the vehicle is retrofit, such that the natural gas tank 18 is mounted within a sufficiently large space of the vehicle, the undercarriage of the vehicle 12, or any other place where the tank 18 will fit without compromising the safety and functionality of the vehicle 12.

Figure 2:
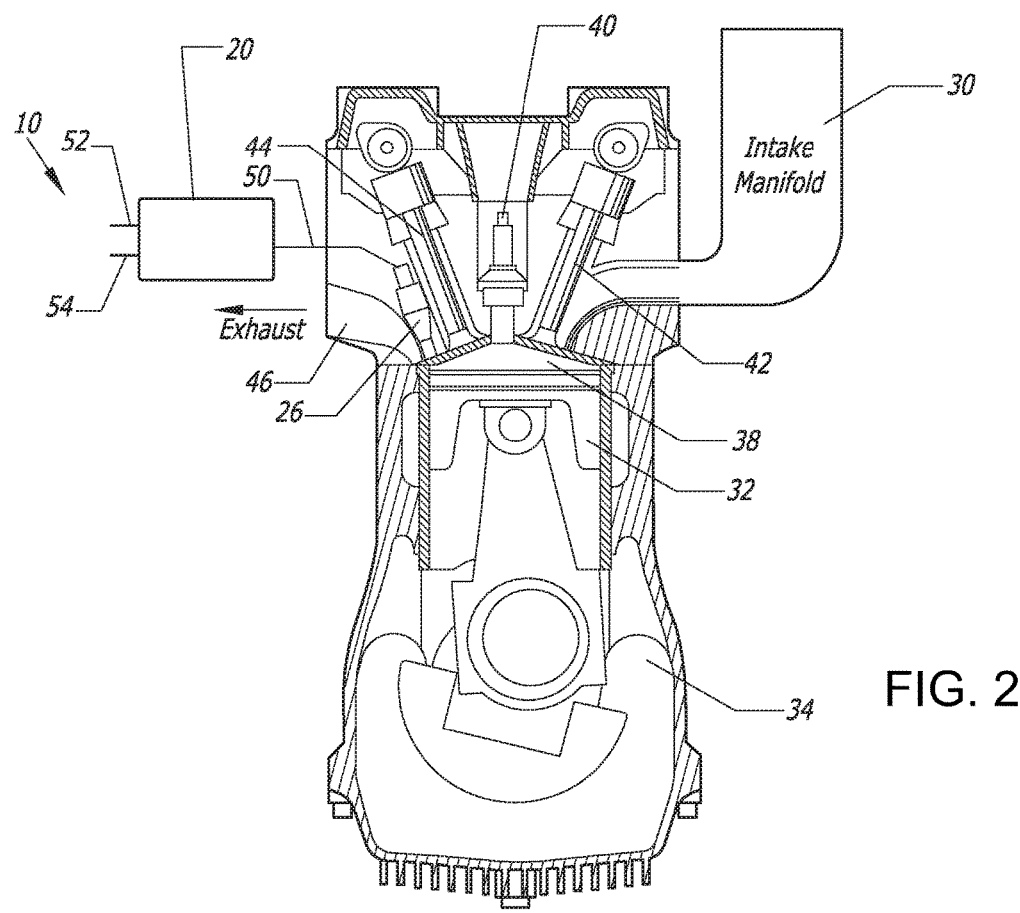
FIG. 2 is a schematic illustration of an engine incorporating a multi-fuel system of the present invention.

With reference now to FIG. 2, a partial cross-sectional and diagrammatic view of a typical engine is shown. Air is received through the intake manifold 30 into the combustion chamber 38 as the intake cam shaft 42 is drawn up. This creates the vacuum necessary to draw the air in. When the intake cam shaft 42 is pushed down, fuel is injected into the combustion chamber 38 by the fuel injector 26. The fuel injector 26 basically acts as an atomizer, producing a fine spray of fuel that is easily ignited by a glow plug 40 as the piston 32 is raised by the crankshaft 36, compressing the fuel to a point of ignition. The resulting combustion forces the piston 32 down into the crankcase 34, which in turn rotates the crankshaft 36. At this point, the exhaust camshaft 44 draws back to create the vacuum necessary to drive the exhaust out of the combustion chamber 38 through the exhaust manifold 46.

The fuel injector 26 is supplied by the fuel supply line 50 from the expansion and mixing chamber 20, which is supplied the diesel fuel 52 from tank 16 and/or the natural gas 54 from tank 18. Typically, the engine will run on either diesel fuel from supply line 52 alone, or a combination of diesel fuel from line 52 and natural gas from line 54.

Figure 3:
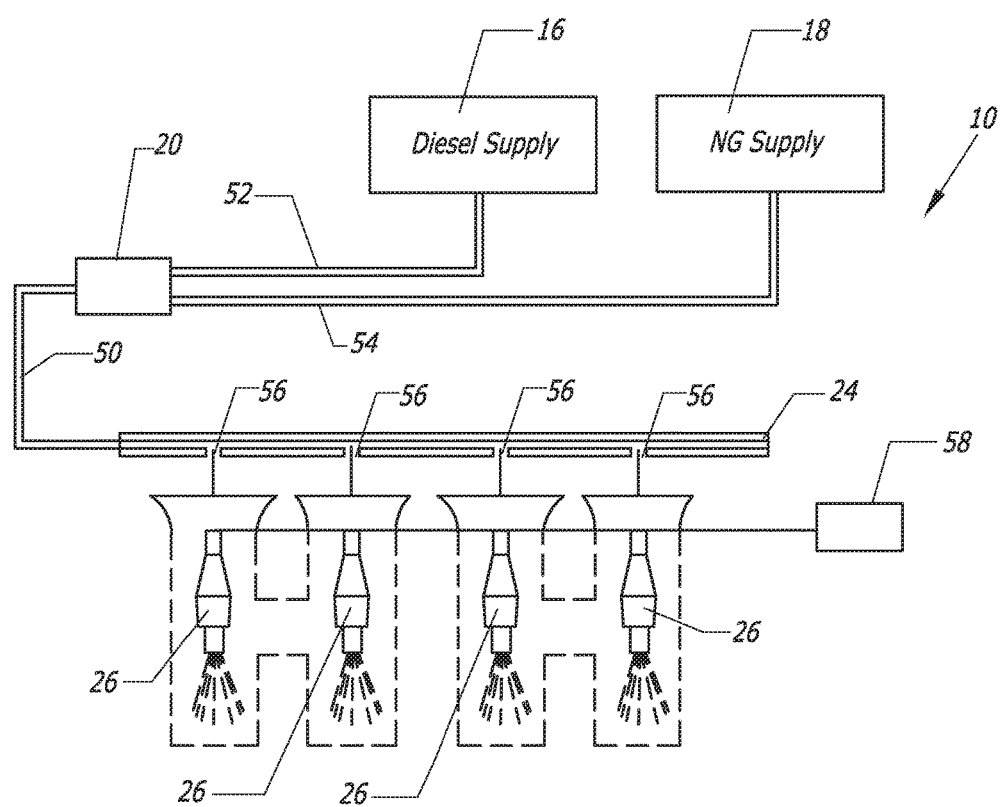
FIG. 3 is a schematic illustration of the fuel injector rail and fuel injectors of the multi-fuel system of the present invention.

Hoses or fuel supply lines 28 interconnect the diesel and natural gas tank 16 and 18 with a mixing and expansion chamber 20. With reference now to FIG. 3, the diesel fuel supply from tank 16 is illustrated with its supply line 52 to mixing and expansion chamber 20. Similarly, the natural gas supply tank 18 is shown with supply line 54 to the mixing and expansion chamber 20. At the expansion and mixing chamber 20, the fuels are aerated and conditioned as necessary for proper mixing and use. The ratio of each fuel supplied can vary depending upon engine parameters. The fuel may be heated or cooled in the mixing chamber 20. The mixed and conditioned fuel is then sent via line 50 either directly to the engine, such as the illustrated fuel injector rail 24 having apertures 56 which lead to the fuel injectors 26 themselves. A microcontroller or ECU 58 is used to control the input of the fuel through the fuel injectors 26 into the cylinders of the engine. The electronic control unit (ECU) 58 tells the fuel injectors 26 when to inject fuel and how much fuel to inject. The ECU 58 is typically part of the vehicle's computer control system. It is also contemplated by the present invention that the mixed fuel be delivered to the intake manifold 30 where it will be mixed with a portion of air for introduction into the cylinder and combustion chamber 38.

Figure 4:
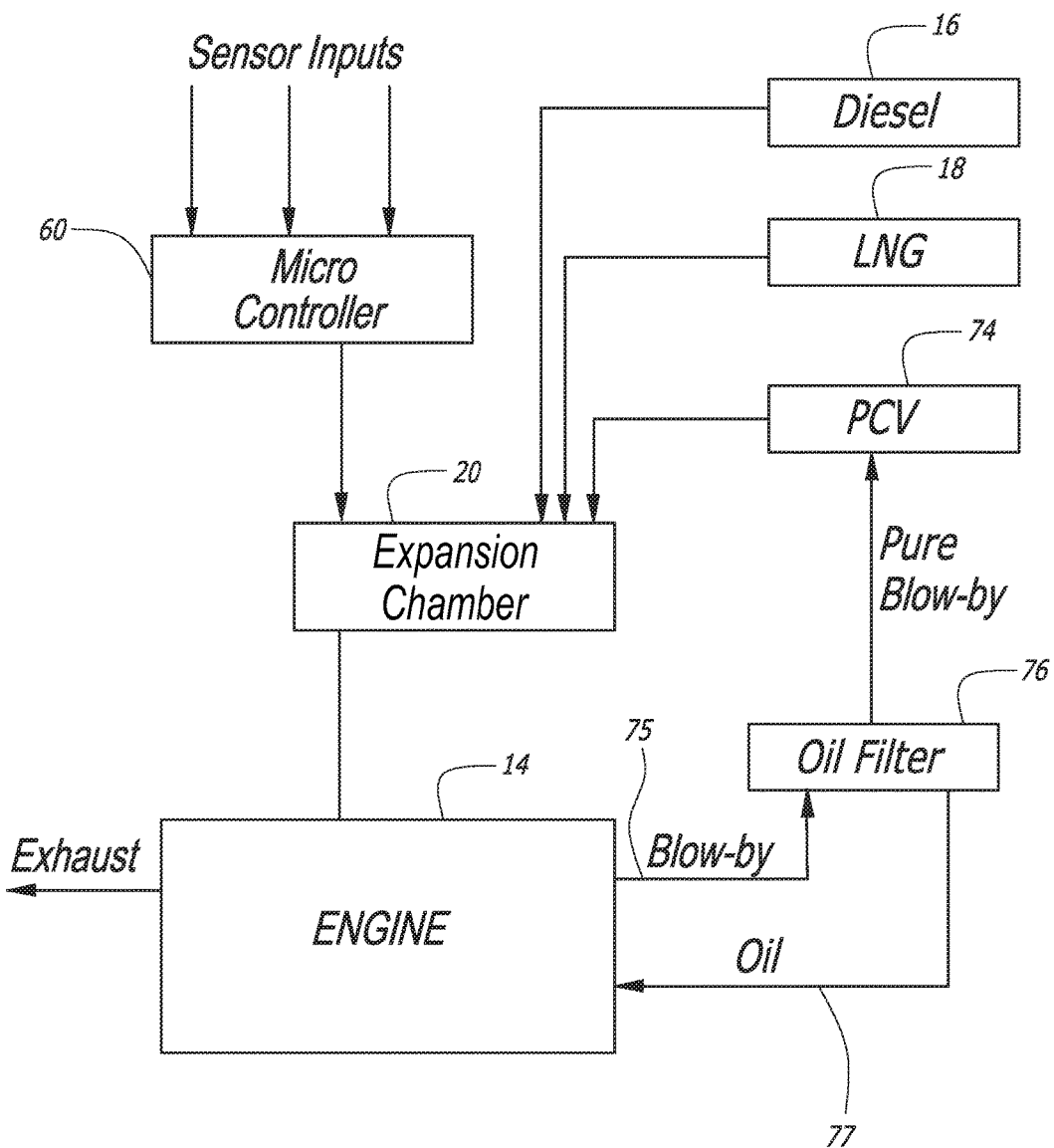
FIG. 4 is a schematic illustration of the multi-fuel system of the present invention.

With reference now to FIG. 4, a schematic drawing of the system of the present invention is shown. The supplies of diesel fuel 16 and natural gas fuel 18 are fed into the expansion and mixing chamber 20. A microcontroller 60, with sensor inputs, is used to determine the proportion of diesel fuel to natural gas fuel at any given time. The conditioning of the mixed fuel, such as by aerating, pressurizing, heating or cooling, etc. is also controlled by the microcontroller 60. The microcontroller 60 may be a separate microcontroller from the ECU 58, but may also comprise the ECU 58 or a modified ECU 58.

Figure 5:
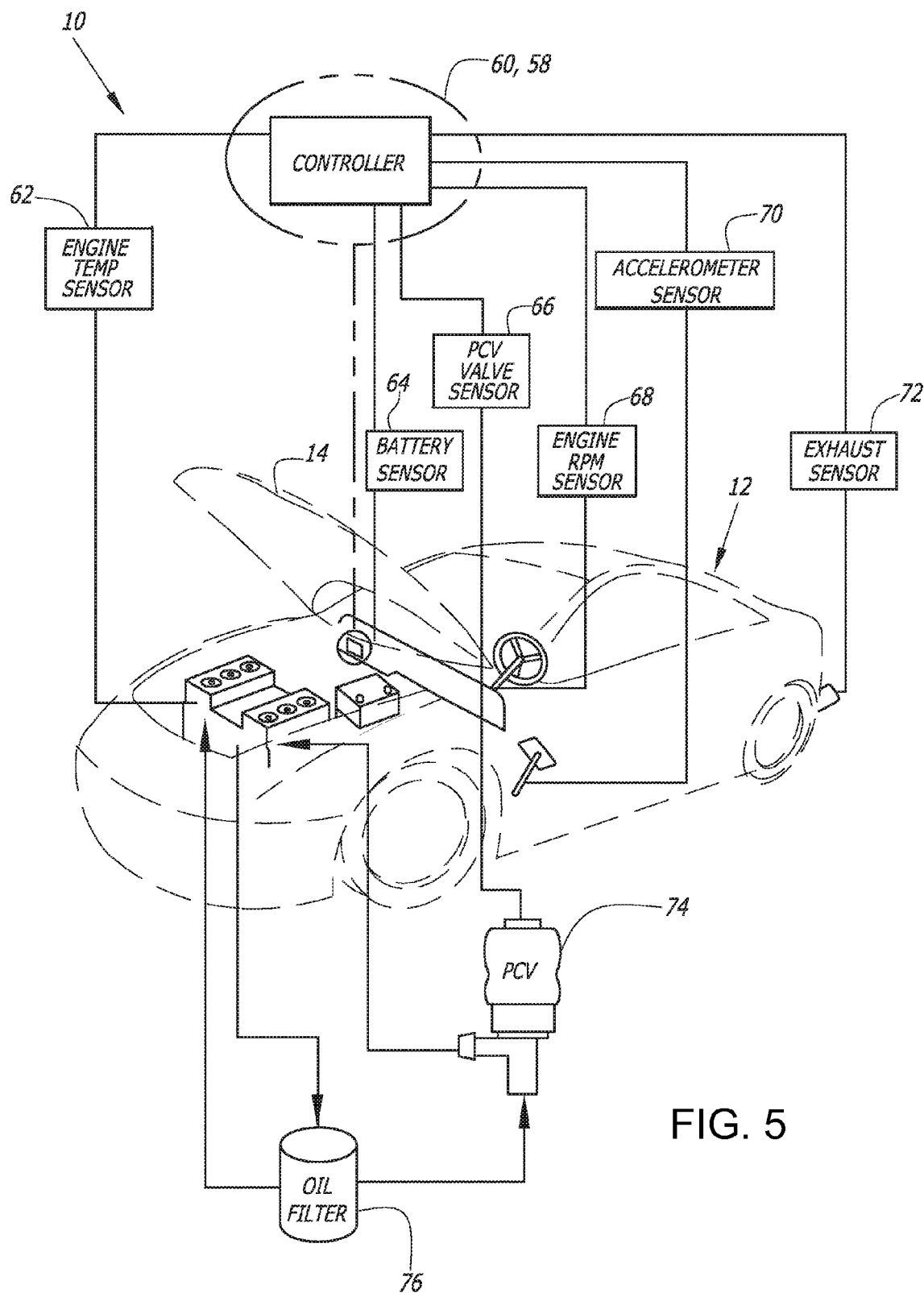
FIG. 5 is a schematic illustration of a multi-fuel system of the present invention having a microcontroller operationally coupled to numerous sensors and a PCV valve.

With reference now to FIG. 5, the controller 58 and/or 60 has sensor inputs to make these determinations. Sensors may include engine temperature sensor 62, battery sensor 64, a PCV valve sensor 66, an engine RPM sensor 68, an accelerometer sensor 70, and an exhaust sensor 72. Other sensors that are typically found in the vehicle and which provide data and signals to the ECU 58 may also be used. In fact, the data from the sensors may be fed directly to the microcontroller 60, or to the ECU 58, which then supplies the data to the microcontroller 60.

Figure 11:
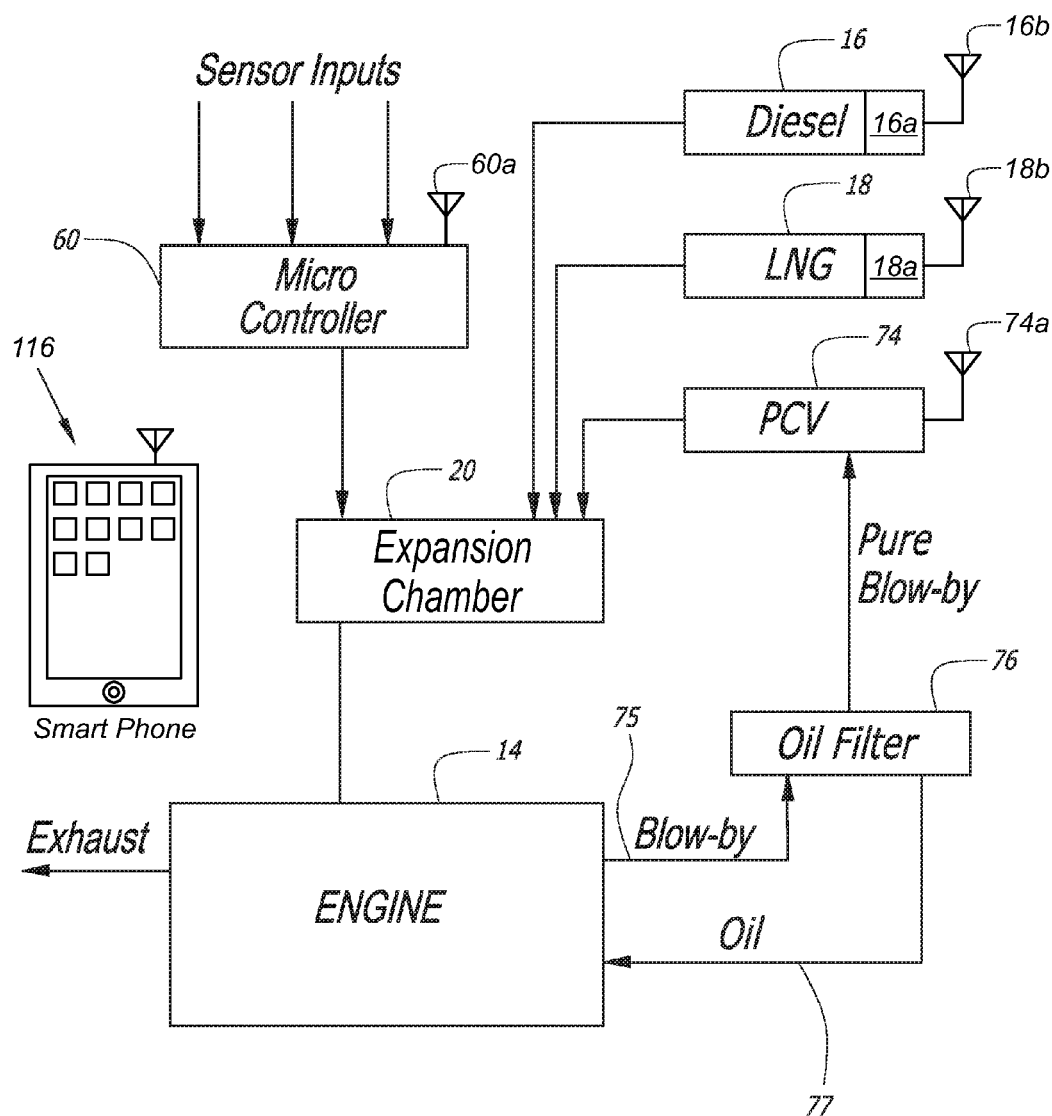
FIG. 11 is a schematic illustration of an alternate embodiment of the multi-fuel system of the present invention.

As shown in FIG. 11, an alternate embodiment of the system may include wireless features for various components. Each of the diesel fuel supply 16 and the natural gas fuel supply 18 may include a fuel level sensor 16a, 18a. In addition, each fuel supply 16, 18 may also include wireless antennae 16b, 18b configured to communicate information obtained by the fuel level sensors 16a, 18a. The fuel level sensors 16a, 18a may communicate the information to a display device such as a dash mounted monitor or smart phone 116. The purpose of such a wireless configuration is to permit aftermarket installation of the system so as not to require hardwiring into the OEM systems of an engine or automobile.

The microcontroller 60 may also include an antenna 60a to permit wireless communication. The microcontroller 60 may wirelessly receive fuel level information from the sensors 16a, 18a and use that information to control the proportion of diesel fuel to natural gas fuel introduced to the mixing chamber 20 based upon the amounts of each left. The dash mounted monitor or smart phone 116 may also receive manual input, as by touch screen, buttons, or similar input devices, to transmit control signals to the microcontroller 60 so as to manually control the proportion of diesel fuel to natural gas in the mixing chamber 20. The dash mounted monitor or smart phone 116 may be provided with an app to give a graphical user interface to permit manual control of the fuel proportions. The same app may also be programmed to respond to voice commands to control switching of the fuel proportions without requiring physical manipulation.

The system may also use the engine sensors 62-72 to detect engine conditions such as increased torque, increased load, or increased altitude. In such instances, the microcontroller 60 may adjust the proportions of diesel fuel and natural gas fuel to a more advantageous mixture. Such engine conditions would benefit from a greater amount of diesel fuel in a mixture. The system may be configured to automatically switch to fuel proportions based upon the sensing of one or more of increased torque, increased load, and/or increased altitude.

With reference again to FIG. 3, it will be appreciated that the present invention contemplates the use of a unique fuel injector rail 24 which is designed to supply the combined and mixed diesel and natural gas fuel to the combustion chambers of the cylinders of the engine. In such case, it is still contemplated that a single fuel injector 26 will be used in each combustion chamber of each cylinder of the engine so as to supply the already premixed fuel supply. It is also contemplated by the present invention that the existing fuel intake and injecting system of the engine be used so as to modify the engine as little as possible to minimize the complexity and expense of retrofitting the vehicle or engine.

With reference to FIGS. 4 and 5, in a particularly preferred embodiment a PCV valve 74, which is controlled by microcontroller 60, regulates the flow of blow-by gasses drawn from the engine crankcase 34 and supplied to the engine for burning. This may be done, for example, by regulating the engine vacuum in a combustion engine through a digital control of the PCV valve 74. The data obtained from the sensors 62-72 by the controller 58 and/or 60 may be used to regulate the PCV valve 74 as well as an oil filter 76.

As illustrated in FIG. 4, a filter 76 is used to filter the blow-by gasses, thus returning filtered oil back into the crankcase 34 of the engine 14, while supplying filtered, pure blow-by gas through the PCV valve 74 to be burned in the engine 14, such as by introducing the filtered blow-by gas into the expansion chamber 20 to be combined with the diesel and/or natural gas fuels. FIG. 11 shows the PCV valve 74 including an antenna 74a. With this antenna 74a, the state (open/closed) of the PCV valve 74 may be wirelessly monitored by the microcontroller 60. The microcontroller 60 may also wirelessly control the state of the PCV valve 74 based upon the sensed condition of the engine 14.

The oil filter 76 illustrated in the figures herein is typically in addition to the regular oil filter, wherein the oil itself is filtered to remove contaminants. Instead, this filter 76 is for the filtering of oil from the blow-by gas removed from the crankcase. The typically cylindrical filters 76 can be clamped in place or threaded into place as needed. Off-the-shelf after market separators or oil filters or the uniquely designed filter 76 illustrated and described herein can be used. While impurities from the oil may be removed, such that the oil returned to the crankcase is filtered and will have better efficacy and life, it is the removal of the liquid oil from the blow-by gas which is of particular interest and concern in the present invention in order not to introduce the oil or contaminants into the combustion chamber, which would result in increased emissions instead of decreased emissions.

Figure 6:
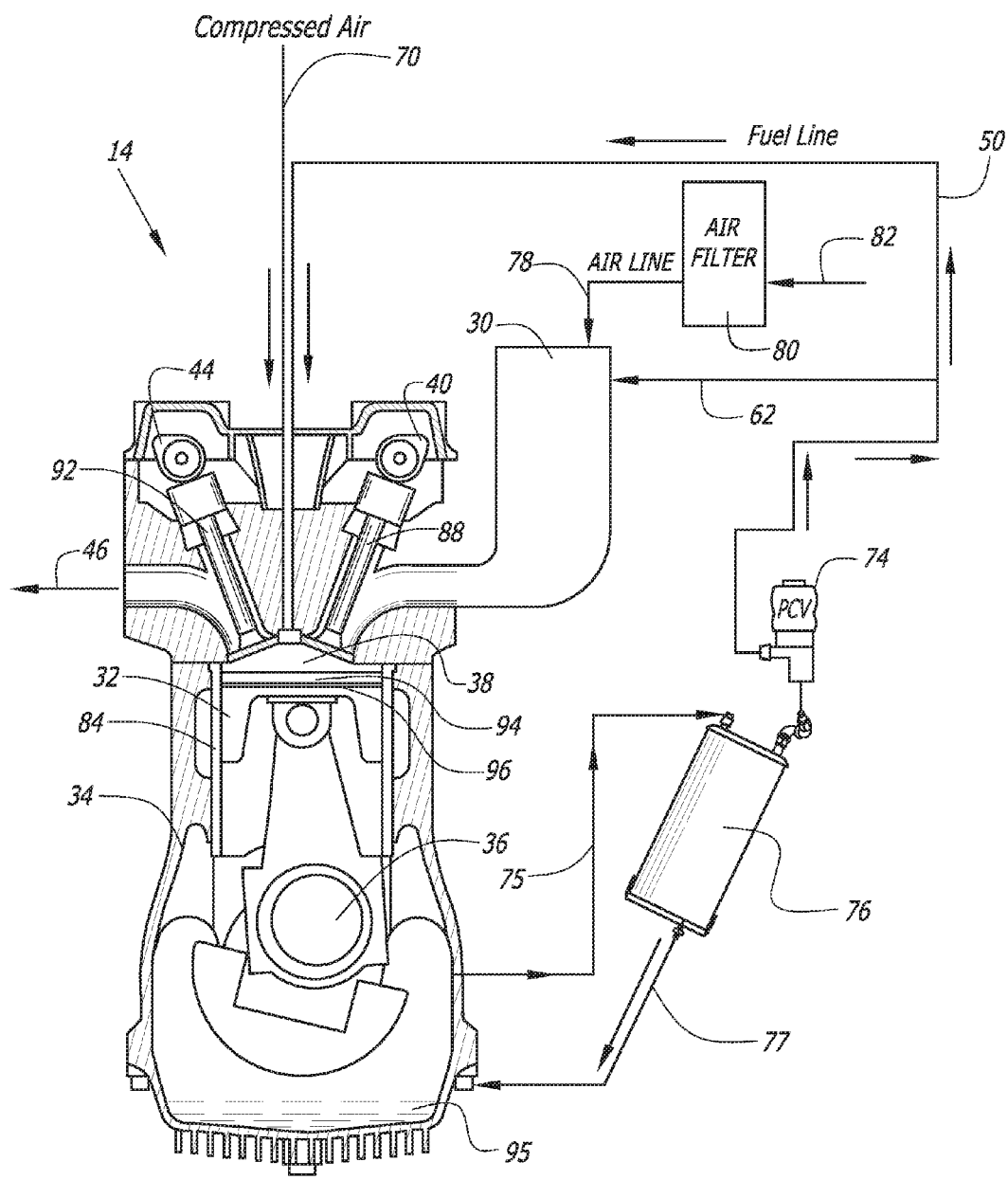
FIG. 6 is a schematic illustration of the general functionality of the multi-fuel system of the present invention.

With reference now to FIG. 6, a schematic view of an engine 14 and the operation of the blow-by filter 76 in conjunction with a PCV valve 74 are shown. As illustrated, the blow-by filter 76 and the PCV valve 74 are disposed in-line in a recirculating line 75 between the crankcase 34 of the engine 14 and the intake manifold 30 and fuel line 50 of the engine 14. In a diesel engine, the intake manifold 30 receives a mixture of fuel and air via fuel line 50 and air line 78. Fuel line 50 also provides fuel for direct injection into the combustion chamber 38. In a gasoline engine, the fuel line 50 does not directly inject fuel into the combustion chamber 38, rather, the fuel line 50 is only connected to the intake manifold 30. An air filter 80 receives fresh air 82, which is delivered through the intake manifold 30 to a piston cylinder and combustion chamber 38 as the piston 32 descends downwardly within the cylinder 84 from the top dead center. As the piston 32 descends downward within the cylinder 84, a vacuum is created within the combustion chamber 38. Accordingly, an input camshaft 42, rotating at a speed timed with the crankshaft 36 is designed to open an input valve 88 thereby subjecting the intake manifold 30 to the engine vacuum. Thus, air is drawn into the combustion chamber 38 from the intake manifold 30.

Once the piston 32 is at the bottom of the piston cylinder, the vacuum effect ends and air is no longer drawn into the combustion chamber 38 from the intake manifold 30. At this point, the piston 32 begins to move back up the piston cylinder 84, and the air in the combustion chamber 38 becomes compressed. In a diesel engine, fuel is injected directly into the combustion chamber 38 from the fuel line 50. This injection may be further aided by more compressed air from a compressed air line 90. The compressed air line 90 is not present in a gasoline engine. As the air and fuel in the combustion chamber 38 is compressed, it heats up until the fuel ignites and combustion occurs.

The rapid expansion of the ignited fuel/air in the combustion chamber 38 causes the piston 36 to move downwardly within the cylinder 84. After combustion, an exhaust camshaft 44 opens an exhaust valve 92 to allow escape of the combustion gasses from the combustion chamber 38 out an exhaust manifold 46.

Typically, during the combustion cycle, excess exhaust gasses slip by a pair of piston rings 94 mounted in the head 96 of the piston 32. These "blow-by gasses" enter the crankcase 34 as high pressure and temperature gasses. Over time, harmful exhaust gasses such as hydrocarbons, carbon monoxide, nitrous oxide and carbon dioxide can condense out from a gaseous state and coat the interior of the crankcase 34 and mix with the oil 95 that lubricates the mechanics within the crankcase 34. As discussed above, the PCV valve 74 is designed to recycle these blow-by gasses from the crankcase 34 to be re-burned by the engine 14. This is accomplished by using a pressure differential between the crankcase 34 and the intake manifold 30. This process may be digitally regulated by a micro-controller.

PCV valve 74 includes a one-way check valve (not shown) that opens to allow blow-by gasses through the valve 74 when the vacuum between the intake manifold 30 and the crankcase 34 is strong enough. With the check valve open, blow-by gasses pass through the PCV valve 74 to be recycled through the intake manifold 30. The check valve can also be controlled by a microcontroller for added fuel efficiency.

Blow-by gasses are not pure fuel vapors. Rather, when the un-ignited fuel is pulled into the crankcase 34, past the piston rings 94, the fuel vapors mix with the oil 95 that lubricates the mechanics within the crankcase 34. Over time, harmful exhaust gasses such as hydrocarbons, carbon monoxide, nitrous oxide and carbon dioxide can condense out from a gaseous state to mix with the oil 95 and the fuel vapors. Thus, the resulting blow-by gasses contain harmful impurities making them unsuitable for re-burning in the engine. In a diesel engine, diesel fuel contains more oil than gasoline, so the blow-by gasses are significantly oilier. Oily and sludgy blow-by gasses are not only non-suitable for re-burn, they also tend to gum up the PCV valve 74 making it impossible for the blow-by gasses to be recycled at all.

Thus, the present invention incorporates a filter 76 to clean the impurities out of the blow-by gasses before they enter the PCV valve 74. The blow-by filter 76 also returns filtered engine oil 95 back into the crankcase 34 by return line 77 for further use. In one embodiment, a check valve is used in the return of the oil back into the crank case. This prevents untreated oil from entering into the oil drainage port of the filter 76. Sensors may be used to detect if the filter 76 becomes too full, and a purging system may be used to resort back to the OEM. A warning system, including alarms, LED lights, etc. may be used to notify the operator of such a situation.

Figure 7:
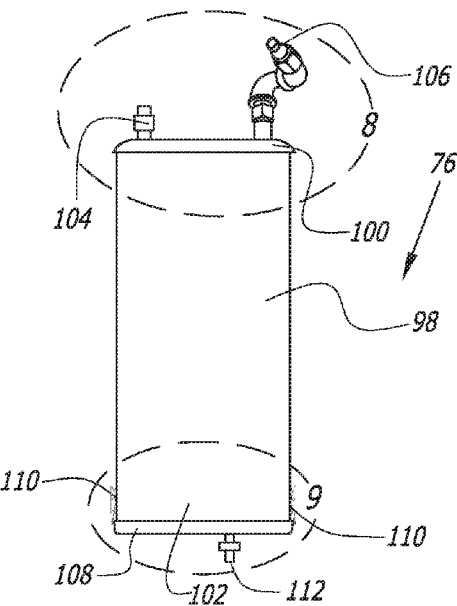
FIG. 7 is an elevational view of the blow-by filter, illustrating placement of the intake, exhaust, and oil drainage ports.

The blow-by filter 76 is particularly illustrated in FIGS. 7-10. In FIG. 7, the blow-by filter 76 is shown in a side view. The blow-by filter 76 includes a canister 98 with a closed top portion or lid 100 and a bottom portion 102. The canister 98 may be made of metal, plastic, or any other material or composite that is suitable for use in high temperature, high pressure tasks. The closed top portion 100 of the canister 98 includes a blow-by intake port 104 and a fuel vapor exhaust port 106. The blow-by intake port 104 receives the blow-by gasses into the interior of the canister 98. The fuel vapor exhaust port 106 vents purified blow-by gasses from the interior of the canister 98 to the PCV valve 74, as illustrated in FIG. 6.

Figure 8:
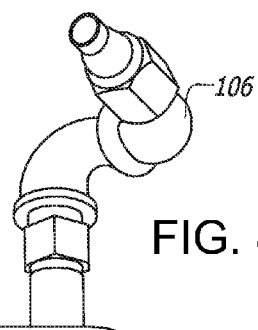
FIG. 8 is an enlarged side view of the area indicated by circle 8 of FIG. 7, illustrating the closed top portion of the canister of the blow-by filter.
Figure 9:
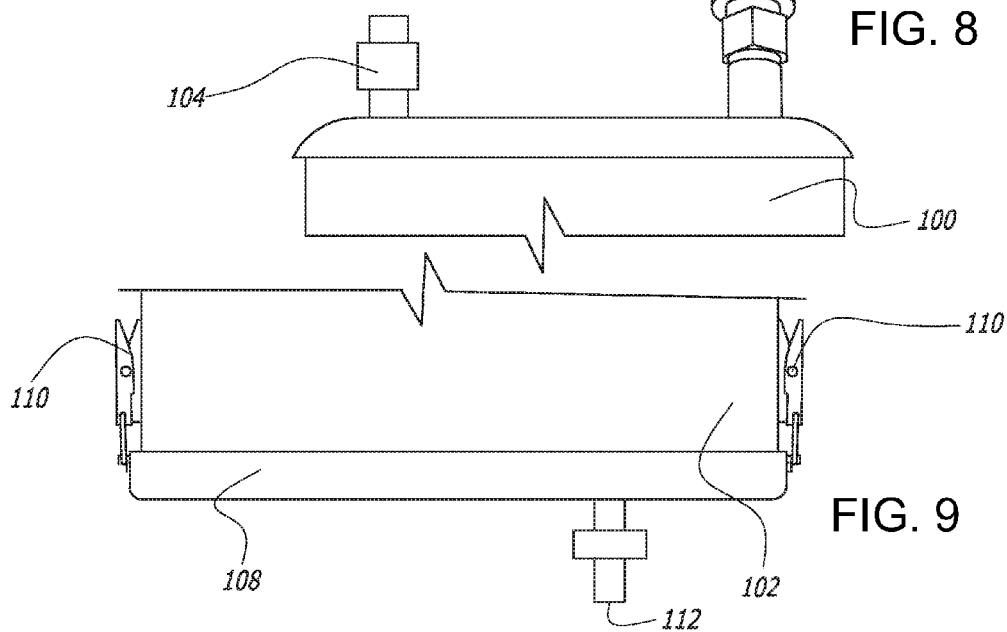
FIG. 9 is an enlarged fragmented view taken from circle 9 of FIG. 7, illustrating the bottom portion of the canister of the blow-by filter.

As illustrated in FIG. 7, the closed top portion 100 of the canister 98 is typically not removable from the canister 98. However, the bottom portion 102 of the canister 98 includes a removable cover 108 with clamps 110. The removable cover 108 includes an oil drainage port 112 that allows the purified oil 95 to drain back into the crankcase 34 of the engine 14. FIGS. 8 and 9 are enlarged views of areas "8" and "9" of FIG. 7, illustrating the upper portion 100 and lower portion 102 of the oil filter canister 98. With reference to FIG. 9, the oil drainage port 112 may be offset from the center of the removable cover 108 in order to account for the angle of the blow-by filter 76 as it is mounted in relation to the vehicle 12. The removable cover 108 allows for easy access to the interior of the canister 98, making for easy cleaning and replacement of the contents of the canister 98.

Figure 10:
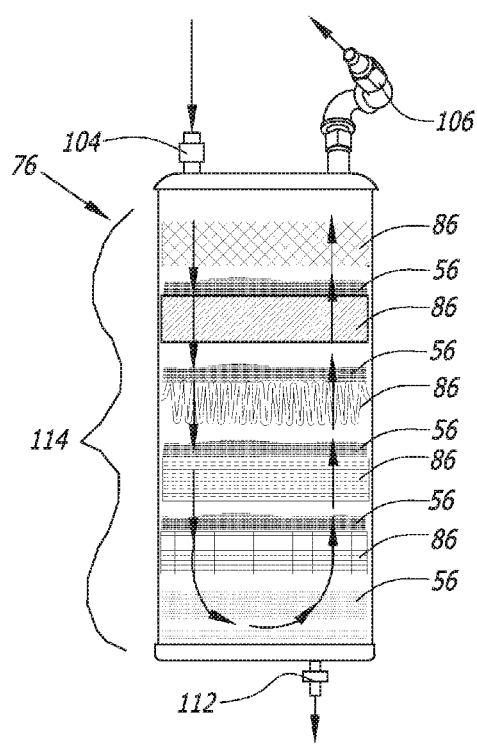
FIG. 10 is a cut-away side view of the blow-by filter, illustrating the filtering assembly with its multiple layers of metal mesh of differing gauges.

With reference now to FIG. 10, the blow-by filter 76 is shown in a cut-away side view. Here, the filtering assembly 114 is shown in detail. The filtering assembly 114 comprises multiple layers of metal mesh 86 of differing gauges. These layers of metal mesh 86 are loaded into the canister 98 through the canister's open end, after removing the cover 108. The layers of metal mesh 86 may be of the same type of metal, or may be of different types of metal. The types of metal that may be used include, but are not limited to, steel, stainless steel, aluminum, copper, brass, bronze, etc.

In operation, unfiltered blow-by gasses are received by the blow-by intake port 104 in the closed top portion 100 of the canister 98. The blow-by gasses begin to circulate through the layers of metal mesh 86 in the canister 98. Different contaminants and impurities are trapped at each layer of metal mesh 86 depending on the gauge of the mesh and type of the metal. Larger contaminants are filtered by larger gauges of metal mesh 86. Smaller contaminants and impurities are filtered by the finer gauges of metal mesh 86. Likewise, some impurities may be trapped by certain types of metal. As the blow-by gasses work through the filtering assembly 114, contaminants and impurities are trapped leaving two main byproducts, namely, cleansed engine oil 95 and purified fuel vapor. The cleansed engine oil 95 eventually collects in the bottom portion 102 of the canister 98, where it drains via the oil drainage port 112 back to the crankcase 34 of the engine 14. The purified fuel vapor is vented through the fuel vapor exhaust port 106 in the closed top portion 100 of the canister 98 to pass to the PCV valve 74 to be recycled through the intake manifold 30 or added to the diesel and/or natural gas fuel mixture in the expansion chamber before being introduced into the combustion chamber 38 of the engine 14.

When the filtering assembly 114 requires periodic cleaning and maintenance, it can be easily removed from the canister 98 by unlatching the clamps 110 and removing the lid 108 from the bottom portion of the canister 98. It will be appreciated that the blow-by oil filter 76 may include sealing gaskets and the like as necessary to create a seal between the canister 98 and the removable lid 108, so as to prevent oil and other contaminants from leaking out. The present invention contemplates that priming might be involved when changing the oil separator/filter elements of the filtering assembly 114.

The computerized controller 60 can be used to monitor the filtering process of the blow-by gasses and the PCV valve 74 and so as to control whether and to what degree the purified blow-by gasses pass through the PCV valve 74 and into either the fuel line 50, the expansion and mixing chamber 20 or directly into the air intake manifold 30 or air line 78. In any event, the blow-by gas which has been filtered presents a much cleaner gas which produces less undesirable emissions.

Although several embodiments have been described in detail for purposes of illustration, various modifications may be made without departing from the scope and spirit of the invention. Accordingly, the invention is not to be limited, except as by the appended claims.

What is claimed is:

1. A multi-fuel engine system, comprising:
   a diesel engine having a diesel tank fluidly connected to a combustion chamber by a first supply line;
   a natural gas tank fluidly connected to the combustion chamber by a second supply line;
   a mixing chamber disposed in-line with the first and second supply lines, wherein diesel fuel from the diesel tank is combined with natural gas from the natural gas tank to form a multi-fuel mixture before the combustion chamber;
   a microcontroller coupled to the mixing chamber and a sensor monitoring an operational characteristic of the diesel engine, wherein the microcontroller selectively modulates an amount of diesel fuel entering the mixing chamber from the first supply line and an amount of natural gas entering the mixing chamber from the second supply line to form the multi-fuel mixture;
   a diesel level sensor in the diesel tank wirelessly connected to the microcontroller and a natural gas level sensor in the natural gas tank wirelessly connected to the microcontroller, wherein the microcontroller is configured to selectively modulate formation of the multi-fuel mixture responsive to signals from the diesel level sensor and the natural gas level sensor; and
   a blow-by gas system including a PCV valve disposed in-line with a recirculating line extending from a crankcase of the diesel engine to the mixing chamber.

2. The multi-fuel engine system of claim 1, wherein the microcontroller is configured to increase the amount of diesel fuel entering the mixing chamber from the first supply line in response to increased torque, increased load, or increased altitude of the engine.

3. The multi-fuel engine system of claim 2, wherein increased torque, increased load, or increased altitude of the engine is determined by analysis of the operational characteristic of the diesel engine by the sensor.

4. The multi-fuel engine system of claim 1, wherein the diesel fuel is combined with the natural gas in the mixing chamber in a range from pure diesel to a 1:1 ratio, in response to a signal from the microcontroller.

5. The multi-fuel engine system of claim 1, wherein the natural gas tank comprises a puncture resistant material or carbon fiber.

6. The multi-fuel engine system of claim 1, wherein the natural gas tank and the second supply line are pressurized.

7. The multi-fuel engine system of claim 1, wherein the operational characteristic monitored by the sensor comprises engine temperature, battery charge, engine RPMs, rate of acceleration, exhaust features, and/or PCV valve position.

8. The multi-fuel engine system of claim 1, wherein the recirculating line of the blow-by gas system further comprises an oil filter between the crankcase and the PCV valve.

9. The multi-fuel engine system of any of claims 1-8, further comprising a fuel injector rail on the diesel engine and a fuel injector extending from the fuel injector rail to the combustion chamber, wherein the fuel injector is responsive to the microcontroller.

10. The multi-fuel engine system of claim 1, further comprising a display device wirelessly connected to the microcontroller, diesel level sensor, and natural gas level sensor, wherein the display device is configured to display a level of diesel fuel in the diesel tank, a level of natural gas in the natural gas tank, and a ratio of diesel fuel to natural gas in the multi-fuel mixture in the mixing chamber.

11. The multi-fuel engine system of claim 10, wherein the display device comprises a smart phone or a dashboard mounted monitor.

12. The multi-fuel engine system of claim 10, wherein the display device is configured to receive user input and transmit control signals to the microcontroller to manually modulate formation of the multi-fuel mixture.

13. The multi-fuel engine system of claim 12, wherein the display device is configured to receive user input by touch screen, button, or voice recognition.

14. A multi-fuel engine system, comprising:
a diesel engine having a diesel tank fluidly connected to a combustion chamber by a first supply line;
a natural gas tank fluidly connected to the combustion chamber by a second supply line;
a mixing chamber disposed in-line with the first and second supply lines, wherein diesel fuel from the diesel tank is combined with natural gas from the natural gas tank in a range from pure diesel to a 1:1 ratio to form a multi-fuel mixture before the combustion chamber, and wherein the multi-fuel mixture is processed by aerating, heating, or cooling in the mixing chamber;
a blow-by gas system comprising a PCV valve disposed in-line with a recirculating line extending from a crankcase of the diesel engine to the mixing chamber;
a microcontroller coupled to the mixing chamber and a sensor monitoring an operational characteristic of the diesel engine, wherein the microcontroller selectively modulates an amount of diesel fuel entering the mixing chamber from the first supply line and an amount of natural gas entering the mixing chamber from the second supply line to form the multi-fuel mixture, and wherein the mixing chamber is responsive to the microcontroller for processing the multi-fuel mixture;
a diesel level sensor in the diesel tank wirelessly connected to the microcontroller and a natural gas level sensor in the natural gas tank wirelessly connected to the microcontroller, wherein the microcontroller is configured to selectively modulate formation of the multi-fuel mixture responsive to signals from the diesel level sensor and the natural gas level sensor; and
a display device wirelessly connected to the microcontroller, diesel level sensor, and natural gas level sensor, wherein the display device is configured to display a level of diesel fuel in the diesel tank, a level of natural gas in the natural gas tank, and a ratio of diesel fuel to natural gas in the multi-fuel mixture in the mixing chamber.

15. The multi-fuel engine system of claim 14, wherein the natural gas tank comprises a puncture resistant material or carbon fiber.

16. The multi-fuel engine system of claim 14, wherein the natural gas tank and the second supply line are pressurized.

17. The multi-fuel engine system of claim 14, wherein the operational characteristic monitored by the sensor comprises engine temperature, battery charge, engine RPMs, rate of acceleration, exhaust features, and/or PCV valve position.

18. The multi-fuel engine system of claim 14, wherein the recirculating line of the blow-by gas system further comprises an oil filter between the crankcase and the PCV valve.

19. The multi-fuel engine system of any of claims 14-18, further comprising a fuel injector rail on the diesel engine and a fuel injector extending from the fuel injector rail to the combustion chamber, wherein the fuel injector is responsive to the microcontroller.

20. The multi-fuel engine system of claim 14, wherein the display device comprises a smart phone or a dashboard mounted monitor.

21. The multi-fuel engine system of claim 14, wherein the display device is configured to receive user input and transmit control signals to the microcontroller to manually modulate formation of the multi-fuel mixture.

22. The multi-fuel engine system of claim 21, wherein the display device is configured to receive user input by touch screen, button, or voice recognition.

23. A multi-fuel engine system, comprising:
a diesel engine having a fuel injector rail, a fuel injector extending from the fuel injector rail into a combustion chamber, and a diesel tank fluidly connected to the combustion chamber by a first supply line through the fuel injector rail and fuel injector;
a natural gas tank fluidly connected to the combustion chamber by a second supply line;
a mixing chamber disposed in-line with the first and second supply lines, wherein diesel fuel from the diesel tank is combined with natural gas from the natural gas tank in a range from pure diesel to a 1:1 ratio to form a multi-fuel mixture before the combustion chamber;
a microcontroller coupled to the mixing chamber, the fuel injector, and a sensor monitoring an operational characteristic of the diesel engine, wherein the microcontroller selectively modulates an amount of diesel fuel entering the mixing chamber from the first supply line and an amount of natural gas entering the mixing chamber from the second supply line to form the multi-fuel mixture, and the fuel injector is responsive to the microcontroller for adding the multi-fuel mixture to the combustion chamber;
a diesel level sensor in the diesel tank wirelessly connected to the microcontroller and a natural gas level sensor in the natural gas tank wirelessly connected to the microcontroller, wherein the microcontroller is configured to selectively modulate formation of the multi-fuel mixture responsive to signals from the diesel level sensor and the natural gas level sensor; and a blow-by gas system comprising an oil filter and a PCV valve disposed in-line with a recirculating line extending from a crankcase of the diesel engine to the mixing chamber.

24. The multi-fuel engine system of claim 23, wherein the natural gas tank comprises a puncture resistant material or carbon fiber, and the natural gas tank and the second supply line are pressurized.

25. The multi-fuel engine system of claim 23, wherein the operational characteristic monitored by the sensor comprises engine temperature, battery charge, engine RPMs, rate of acceleration, exhaust features, and/or PCV valve position.

26. The multi-fuel engine system of claim 23, further comprising a display device wirelessly connected to the microcontroller, diesel level sensor, and natural gas level sensor, wherein the display device is configured to display a level of diesel fuel in the diesel tank, a level of natural gas in the natural gas tank, and a ratio of diesel fuel to natural gas in the multi-fuel mixture in the mixing chamber.

27. The multi-fuel engine system of claim 26, wherein the display device comprises a smart phone or a dashboard mounted monitor.

28. The multi-fuel engine system of claim 26, wherein the display device is configured to receive user input and transmit control signals to the microcontroller to manually modulate formation of the multi-fuel mixture.

29. The multi-fuel engine system of claim 28, wherein the display device is configured to receive user input by touch screen, button, or voice recognition.

* * * * *